July 25, 1961 F. S. SCHRATT 2,993,378
THERMOMETER HAVING CALIBRATION COMPENSATOR
Filed April 6, 1960
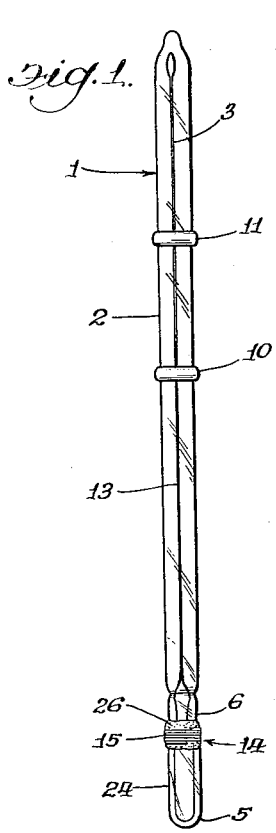
Fig. 1.
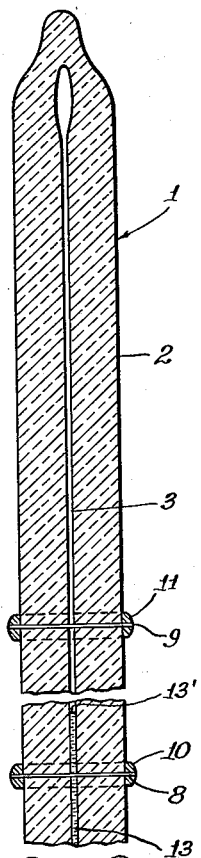
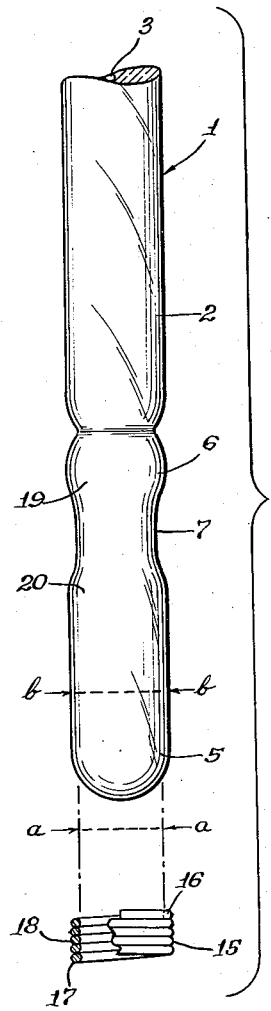
Fig. 2.
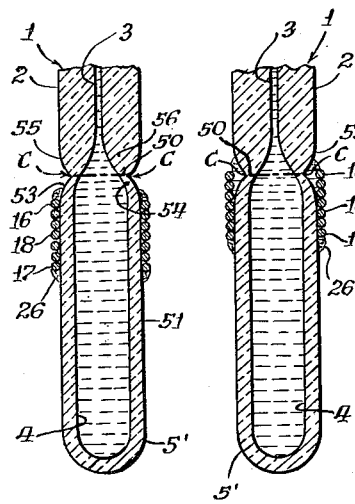
Fig. 4.
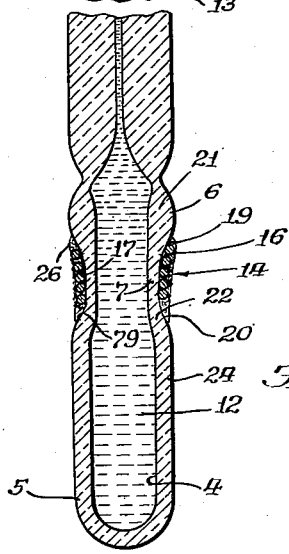
Fig. 5.
Fig. 3.
INVENTOR.
Frank S. Schratt
BY John J. Kowalik
Atty.

United States Patent Office 2,993,378
Patented July 25, 1961

2,993,378
THERMOMETER HAVING CALIBRATION COMPENSATOR
Frank S. Schratt, 9741 Elms Terrace, Des Plaines, Ill.
Filed Apr. 6, 1960, Ser. No. 20,347
11 Claims. (Cl. 73—362.4)

This invention relates to thermometers and more specifically to a novel compensating means for accurately calibrating the same.

In the ordinary manufacture of thermometers it is accepted that a large number will be rejected because they read low and frequently this becomes excessive that large production losses are sustained.

Heretofore, no simple and effective solution had been found and normally the defective units had to be discarded.

A general object of the invention is to provide a novel effective and simple means for recalibrating a thermometer.

A further object is to provide a novel compensating assembly which may be applied to the thermometer and adjusted to obtain a correct reading by the most inexperienced workman.

A further object is to provide an inexpensive but highly accurate thermometer.

More specifically the invention contemplates the provision of a thermometer having a bulb portion of relatively thin section which may be readily collapsed or deflected inwardly to thus displace the mercury from the bulb into the column to thus incrementally elevate the same in the required amount.

Particularly, the invention comprehends the provision of a novel compensator in the form of a close wound coil spring with an internal diameter slightly smaller than the external diameter of the bulb and which may be shifted onto and off the bulb portion to increase and decrease the number of coils effecting hoop tension on the bulb.

A still further object of the invention is to so arrange the spring and bulb that the former may be wedged onto and off the latter to obtain more or less deflection.

In one embodiment of the invention the different amounts of deflection is obtained by sliding the spring along the thin bulb and adjoining thick stem and adjusting the spring thereon in that more or less coils embrace the bulb as is required to elevate the mercury column, the stem having sufficient rigidity to resist deflection.

These and other objects and advantages inherent in and encompassed by the invention will become more apparent from the following specification and drawings, wherein:

FIGURE 1 is an elevational view of a thermometer incorporating the invention;

FIGURE 2 is an enlarged axial section of FIGURE 1, and

FIGURE 3 is a fragmentary exploded view illustrating the parts in preassembly position;

FIGURES 4 and 5 are fragmentary views illustrating a further embodiment. FIGURE 4 being an axial sectional view with the compensating means in one position, and FIGURE 5 is an elevational view with the compensating means in another position.

Embodiment of FIGURES 1-3

Describing the invention in detail and having particular reference to the drawings, there is shown a thermometer generally indicated 1 which comprises a thick, relatively rigid stem or column portion 2 preferably of cylindrical section having an axial bore 3 leading into a cavity 4 of a thin wall section elongated cylindrical bulb 5 which is secured to the stem 3 in axial extension thereof. The bulb is necked down at 7 and of thinner section thereat for a purpose hereinafter disclosed.

The stem is provided with lower and upper electrodes 8 and 9 spaced axially of the stem and extending tangentially through the bore 3. Electrode 8 is secured to a contact ring 10 and electrode 9, or temperature indicating indicia, is connected to contact ring 11, said rings embracing the stem. The position of electrode 9 is critical and must be located so that at the rated temperature the thermally expansible and contractible substance mercury 12 in bulb 5 will raise the column 13 in bore 3 to a height such that the head 13' of column 13 will contact electrode 9 to complete a circuit from 8 to 9 and thus to conduits connected thereto of apparatus not shown.

In the manufacture of thermometers of the type under consideration considerable difficulty and a high degree of skill and experience are required to insure correct temperature registry by the head 13' with electrode or indicia 9. Even with such skill in the making frequently minor tolerance has been permitted because otherwise the cost would be prohibitive.

The arrangement herein disclosed obtains accuracy within one hundreth of a degree without the necessity of expert fabrication or facilities requiring high skill in operation and comprises the provision of a compensating means generally designated 14 which includes a close wound coil spring 15 having end coils 16 and 17 and intermediate coils 18. As best seen in FIGURE 2, the inner diameter represented $a$—$a$ is slightly less than the diameter $b$—$b$ of the bulb 5 and is adapted to fit endwise axially over the bulb 5 and be moved onto the necked portion 7 which is of slightly less than or equal to diameter $a$—$a$. The spring fits between the outwardly reversely diverging frusto-conical wedging surfaces 19 and 20 on the shoulders 21 and 22 at opposite ends of the necked down portion 7 which axially approximates the length of spring 15. Inasmuch as the spring is in the centered position on the portion 7 does not exert hoop tension or loading no effect is obtained on the thermometer. The movement or displacement of the spring 15 in either direction wedges the related end coil onto the respective shoulder with attendant inward deflection of the contiguous portion of the bulb wall. In other words if the spring 15 is moved toward shoulder 21 the end coil 16 would expand and wedges onto surface 19. Further movement of the spring progressively wedges the intermediate coils 18. As the spring is incrementally advanced onto shoulder 21, the deflection of the contiguous wall portions inwardly of the bulb progresses. This incremental adjustment of the spring is alternated with the dipping of the bulb into a bath of water or the like which is being accurately maintained at the rated temperature corresponding to the contact of head 13' with electrode 9. As long as the thermometer reads low, the spring is advanced until the head 13' contacts 9 at the rated temperature.

In the event that sufficient compression of the bulb cannot be obtained by movement of the spring onto shoulder 21, then the spring is moved axially into the shoulder 22 wedging and expanding end coils 17 onto surface 20. The spring is incrementally progressed onto surface 20 with the intermediate coils 18 as it is tested by alternately dipping the bulb in the test bath which is maintained at rated temperature. Maximum adjustment occurs when the entire spring is displaced from the necked down portion 7 and embraces the cylindrical outer end or lower part 24 of the bulb 5. Thus it will be noted that very fine adjustment is possible and for each adjustment the bulb 5 is differently compressed to proportionately elevate or lower the column to rated temperature. After the adjustment and calibration are completed, an anchoring medium in the form of a thermoplastic or thermosetting preferably plastic bonding substance is applied about in the form of a ring 26 about the coil spring which secures itself to the glass material from which the thermometer is made to prevent the compensator from slipping out of adjusted position.

*Embodiment of Figures 3 and 4*

Referring now to the embodiment of FIGURES 3 and 4 wherein parts identical to those of the previous embodiment are identified by corresponding numerals, the bulb 5' is of thin wall section but the necked down portion is eliminated. The juncture between bulb 5' and stem 3 is necked down at 50. The periphery 51 is of substantially uniform diameter. In the instant application the maximum adjustment positions the entire spring, which has an internal diameter less than the external diameter of bulb 5'. As best seen in FIGURE 4 lesser deflection of the bulb is obtained, and thus less column height by moving the spring endwise so that the coils 16 wedges off the frusto-conical surface 53 on shoulder 54 and overhangs the smallest diameter c—c at the juncture of bulb 5' with stem 3. Further adjustment by moving the spring 15 toward stem 3 wedges coil 16 into the frusto conical surface 55 on shoulder 56 formed on the stem 3 at its juncture with bulb 5'. Since the stem is thick and preferably of sufficient section to resist the load developed by the spring the movement of spring 15 into the stem has the effect of gradually reducing the effective number of coils which engage periphery 51. Thus it will be seen that a very accurate adjustment of the thermometer is feasible by positioning of the spring 15. The more coils on the stem the lesser the deflection of the bulb and consequent lower positioning of the column 13. If the column must be elevated more then the spring is moved more onto periphery 51. As in the previous embodiment, the position of the spring 16 is adjusted until the thermometer reads at the rated temperature. Thus the band of adhesive 26 is applied to secure the spring to the glass substance of the thermometer.

Having described the preferred embodiment of the invention in detail it will be understood that many other variations will become apparent to those skilled in the art within the scope of the appended claims.

I claim:

1. In a thermometer having a stem with a bore and a bulb with a chamber communicating with the bore and a thermally expansible and contractible substance in the chamber and the bore, temperature indicia on the stem, and compensating means mounted on the bulb in compressing relation thereto and comprising a spring having at least one coil embracing the bulb in deflecting relation thereto.

2. In a thermometer having a stem with a bore and a bulb with a chamber communicating with the bore, a thermally expandable and contractible substance in the bulb ascendable in a column into the bore to indicate temperature readings, indicia on the stem registrable against said column, said bulb having at least one deflectible portion, and compensating means mounted on said bulb and comprising a spring having coils embracing said portion and movable onto and off said portion to vary the deflection thereof to raise and lower said column to register with said indicia at rated temperature.

3. A thermometer having a stem with a bore and a thin wall bulb having a chamber communicating with the bore, indicia on the stem, mercury or the like in said chamber expandable into the bore to provide a column having a head for registering with said indicia at a predetermined temperature, and compensating means mounted on the bulb for raising said column to register the head thereof with said indicia when said column is below said indicia upon the thermometer being subjected to the rated temperature, said means comprising a coil spring having an internal diameter less than the bulb and incrementally movable onto portions thereof a distance deflecting the bulb sufficiently to elevate the column to said indicia at said rated temperature.

4. In a thermometer having a stem and a bulb said bulb having at least a portion of relatively thin deflectible glass, and compensating means comprising a coil spring of a diameter less than the said portion of the bulb and movable incrementally onto and off said portion of the bulb for deflecting a contiguous section thereof.

5. The invention according to claim 4 and said portion comprising a wedge surface tapered toward the adjacent end of the spring.

6. The invention according to claim 4 and said portion disposed intermediate the ends of said bulb and said bulb having a necked down portion contiguous to said portion and supporting said spring.

7. The invention according to claim 4 and means securing said spring in adjusted position.

8. In a glass thermometer having a thick section stem and thin section bulb, compensating means mounted on the bulb in deflecting relation thereto and including a coil spring providing a hoop tension acting on the bulb, said bulb and spring incrementally telescopable to vary the deflection of the bulb.

9. The invention according to claim 8 and said bulb and stem being substantially of the same diameter and disposed in end to end relation and said spring movable axially between said stem and said bulb.

10. The invention according to claim 8 and said bulb having wedging areas at opposite ends of the spring and said spring having wedging relation with either of said areas.

11. The invention according to claim 8 and said bulb having a first portion of a diameter not greater than the interior diameter of the spring and another portion contiguous to the first of larger diameter over which the spring is adapted to be telescoped.

References Cited in the file of this patent

UNITED STATES PATENTS

| | | |
|---|---|---|
| 489,259 | Maxim et al. | Jan. 3, 1893 |
| 695,262 | Zeal | Mar. 11, 1902 |
| 2,894,393 | Koelle | July 14, 1959 |